US 7,441,266 B2

(12) United States Patent
Kurian et al.

(10) Patent No.: US 7,441,266 B2
(45) Date of Patent: *Oct. 21, 2008

(54) WIRELESS COMMUNICATION SYSTEM UTILIZING WIRELESS ADAPTER (75) Inventors: Ligy Kurian, Houston, TX (US); James A. Jensen, Tomball, TX (US); Paul L. Drew, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/590,226

(22) Filed: Oct. 31, 2006

(65) Prior Publication Data
US 2007/0044145 A1    Feb. 22, 2007

Related U.S. Application Data (63) Continuation of application No. 09/639,960, filed on Aug. 16, 2000, now Pat. No. 7,207,059.

(51) Int. Cl.
H04L 9/00 (2006.01)

(52) U.S. Cl. .............................. 726/9; 726/20; 713/159; 710/305; 710/313; 380/270

(58) Field of Classification Search .................... 726/9, 726/20; 380/270; 705/67, 76; 713/159, 713/169, 172; 710/305, 313
See application file for complete search history.

(56) References Cited

U.S. PATENT DOCUMENTS

| 6,174,205 | B1 * | 1/2001 | Madsen et al. ............... 439/638 |
| 6,217,351 | B1 | 4/2001 | Fung et al. |
| 6,255,800 | B1 | 7/2001 | Bork |
| 6,519,290 | B1 | 2/2003 | Green |
| 6,671,808 | B1 | 12/2003 | Abbott et al. |
| 6,992,996 | B2 * | 1/2006 | Sugaya ....................... 370/328 |

OTHER PUBLICATIONS

Fuhr, Peter L., Bluetooth, Jul. 2000, pp. 1-6.
Dahlberg, et al., The Bluetooth Technology, Jun. 2000, pp. 1-6, 15.

* cited by examiner

Primary Examiner—Emmanuel L Moise
Assistant Examiner—Paul Callahan (57) ABSTRACT An electronic system is disclosed. In one embodiment, the electronic system comprises a wireless communication adapter that includes an antenna for transmitting and/or receiving information and a connector configured to enable selective mating engagement of the connector with a connection port of an electronic device. In one embodiment, the wireless communication adapter is configured to communicate information between first and second electronic devices via the antenna. Other electronic systems, devices, and methods are also disclosed.

30 Claims, 8 Drawing Sheets

WIRELESS COMMUNICATION SYSTEM UTILIZING WIRELESS ADAPTER

CROSS-REFERENCE TO RELATED APPLICATIONS

This application is a continuation of U.S. application Ser. No. 09/639,960, which was filed on Aug. 16, 2000, now U.S. Pat. No. 7,207,059.

BACKGROUND OF THE INVENTION

Many electronic systems are composed of separate components electrically coupled together by cabling. Examples of component electronics systems include audio and video equipment, computer systems, and some appliances. Computers, typically, consist of several different electronic devices coupled together to form a computing system. A typical computer consists of a central unit, housing a microprocessor, and a number of additional components connected by cables to the central unit. Examples of additional components include: a monitor, a printer, a mouse, a keyboard, a scanner or speakers. Typically, each component has its own cable to connect the component to the central unit so that power or data may be transferred between the components. Thus, the greater the number of components, the greater the number of cables routed amongst the components of the system.

Routing numerous cables between electronic components increases the complexity of assembling a component system. For example, routing cables between the various components of an audio/video system, appliances or computer system can be a confusing and difficult task for the typical consumer. Cables also make it difficult to move components once the system is connected. Additionally, a large number of cables routed about the various components can make the system look cluttered and unattractive.

Wireless systems have been used to transmit data between some components of an electronic system, such as a remote control for a television. However, these systems typically require the components be in direct line-of-sight or utilize an obtrusive antenna system, thus adding to desktop clutter.

BRIEF DESCRIPTION OF THE DRAWINGS

The invention will hereafter be described with reference to the accompanying drawings, wherein like reference numerals denote like elements, and in which.

DETAILED DESCRIPTION OF THE PREFERRED EMBODIMENTS

Figure 1:
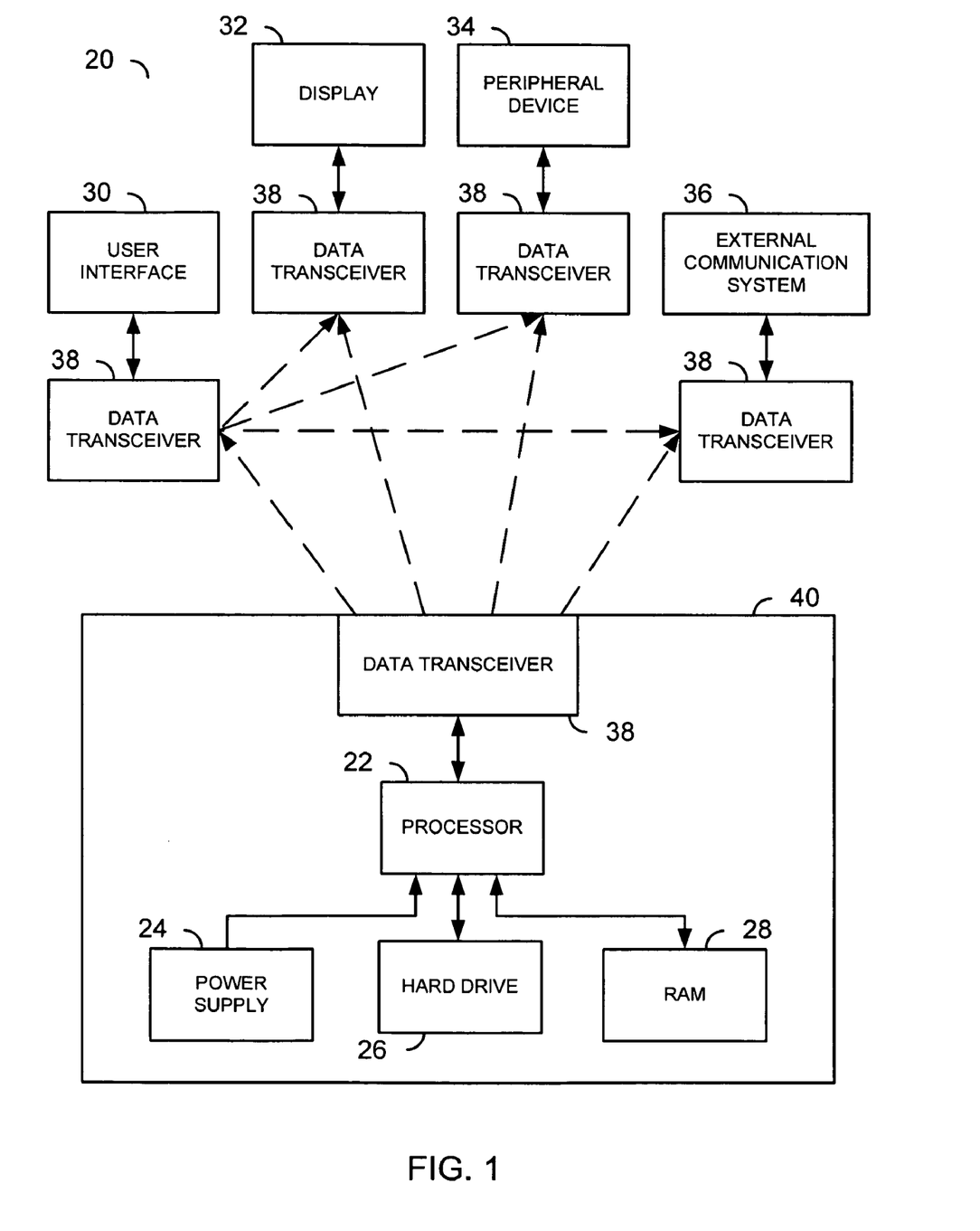
FIG. 1 is a block diagram of a computer system, according to one embodiment of the present invention.

Referring generally to FIG. 1, a block diagram is illustrated depicting an exemplary computer system, generally designated by the reference numeral 20. Computer 20 may be any of a variety of different types, such as a workstation, a desktop computer, or a notebook computer. In the illustrated embodiment, a processor 22 controls the operation of the computer 20. Computer 20 includes a power supply 24 to supply electrical power to various components of system 20.

Processor 22 utilizes programming to control the operation of the computer system 20. Memory is coupled to processor 22 to store and facilitate execution of the programming. In the illustrated embodiment, processor 22 is coupled to a hard drive 26 and RAM 28. Computer system 20 can include additional components, such as a disk drive, a tape drive or some other memory storage device. Non-volatile memory can also include read only memory (ROM), such as an EPROM, to be used in conjunction with RAM 26. A variety of memory modules, such as DIMMs, DRAMs, SDRAMs, SRAMs, etc. can be utilized for a given device or application.

Various components of computer 20 may be coupled to processor 22, depending upon the desired functions of computer 20. In the illustrated embodiment, a user interface 30 is coupled to processor 22. Examples of user interface 30 include a keyboard, a mouse, a joystick, buttons, switches, a light pen, or a voice recognition system. A display 32 is coupled to processor 22. Examples of display 32 include a computer monitor, a television screen, or an audio speaker. A peripheral device 34, such as a printer or a scanner, also can be coupled to the processor 22. Additionally, processor 22 may be coupled to an external communication system 36, such as a network or telephone system.

In the illustrated embodiment, a data transmitter/receiver 38, or transceiver, is used to enable wireless communication between the various remote components of computer system 20 and its central unit 40 containing processor 22, e.g., the main processor unit of a personal computer. As a transmitter, transceiver 38 converts data into electromagnetic waves. As a receiver, transceiver 38 converts electromagnetic waves into data. In the illustrated embodiment, central unit 40 includes processor 22, power supply 24, hard drive 26, RAM 28, and data transceiver 38.

Figure 2:
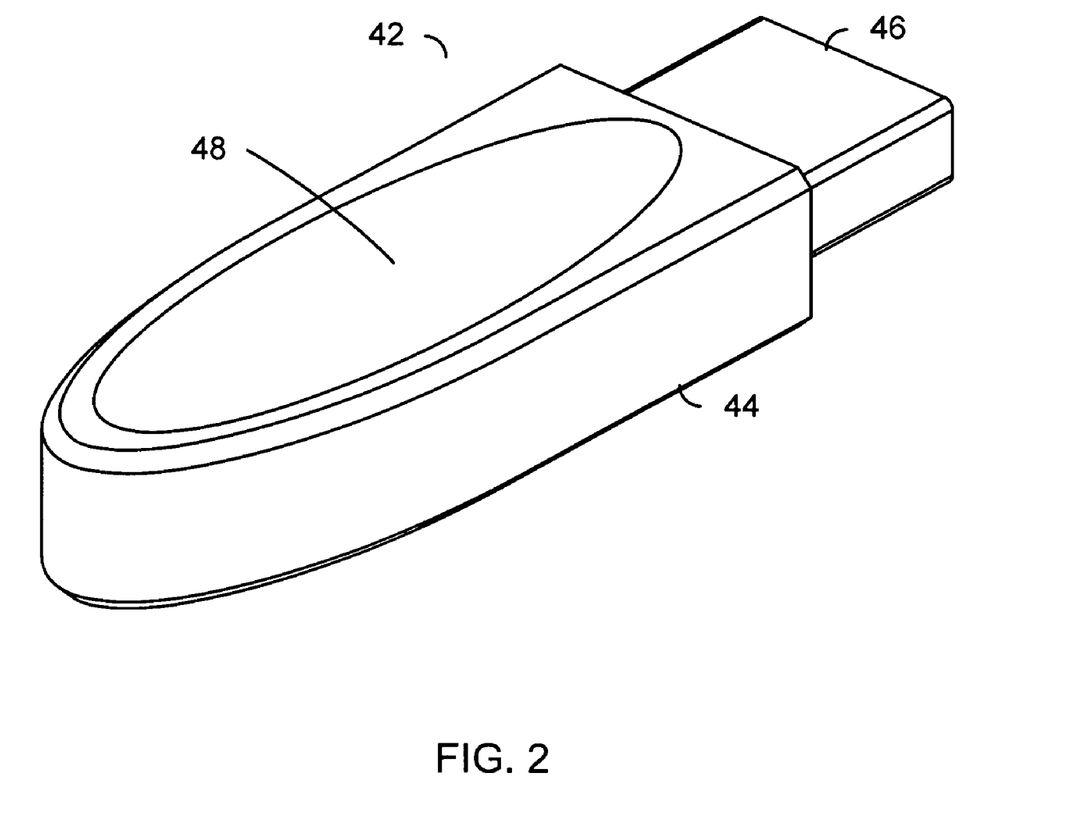
FIG. 2 is a perspective view of a communication dongle in accordance with one embodiment of the present invention.

Referring generally to FIG. 2, an exemplary embodiment is featured of a communication dongle 42 housing data transceiver 38. Communication dongle 42 is disposed on the exterior of an enclosure. Communication dongle 42 has a main body 44 and a connector portion 46. In the exemplary embodiment, data transceiver 38 is disposed within main body 44. Connector portion 46 is used to couple data transceiver 38 to central unit 40. In the exemplary embodiment, main body 44 and connector portion 46 form an integrated unit, the weight of which is supported entirely by the connection between the connector portion 46 and the external electrical connector. Consequently, it is preferable to manufacture the dongle in a small form, low in weight.

Main body 44 can be comprised of a variety of materials. In the exemplary embodiment, main body 44 is comprised of a moldable plastic. A recess 48 is formed in main body 48 to provide a gripping surface for installing and removing communication dongle 42 from central unit 40.

Figure 3:
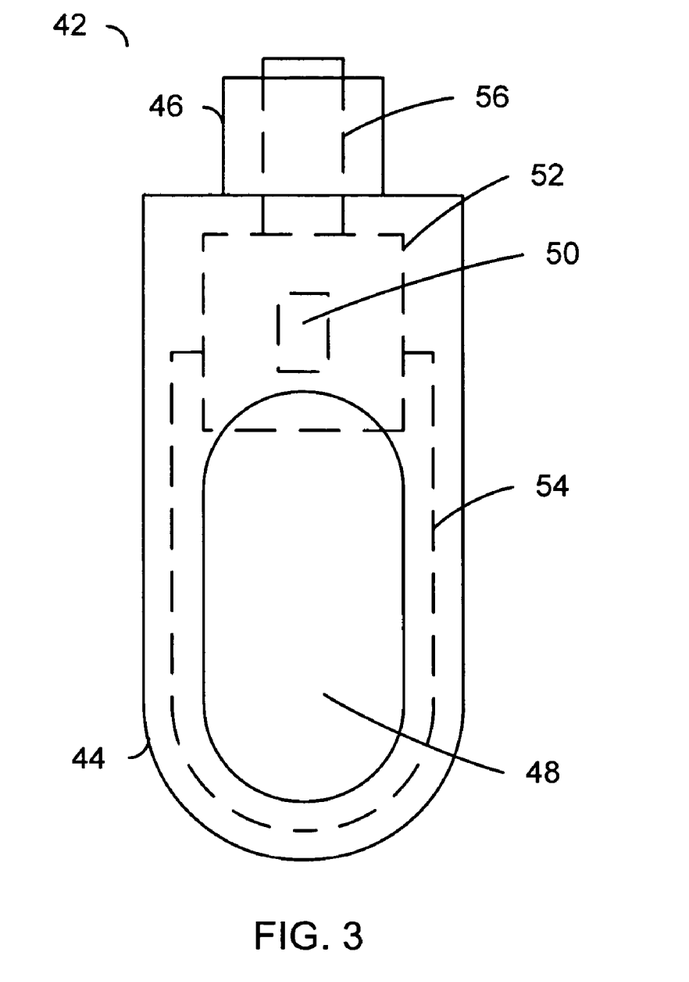
FIG. 3 is a top view of a communication dongle with internal components marked by dashed lines in accordance with one embodiment of the present invention.
Figure 4:
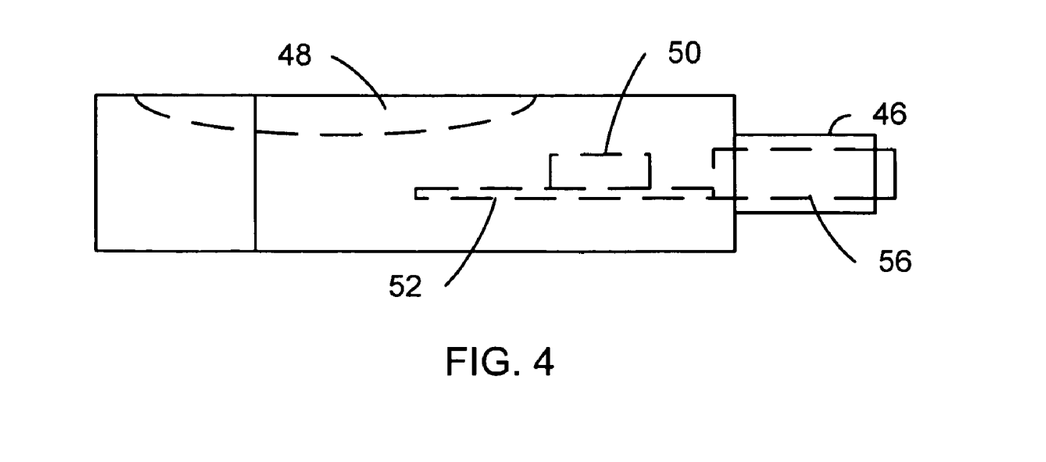
FIG. 4 is a side view of the communication dongle of FIG. 3 with internal components marked by dashed lines in accordance with one embodiment of the present invention.

Referring generally to FIGS. 3 and 4, the exemplary embodiment of data transceiver 38 within communication dongle 42 utilizes an integrated circuit (IC) 50 mounted on a circuit board 52. Circuit board 52 electrically couples IC 50 to an antenna 54 and to an electrical connector 56. Electrical connector 56, in turn, couples IC 50 to central unit 40. Electrical connector 56 also secures communication dongle 42 to central unit 40.

In the exemplary embodiment, computer system 20 utilizes "bluetooth" technology. Bluetooth is an always-operating short-range radio that is a cross-industry standard for wireless communications. In this embodiment, IC 50 and circuit board 52 are designed to transfer information received via antenna 54 to processor 22 and to transmit information over antenna 54 under the direction of processor 22. The configuration of IC 50 and board 52 depends on the specific wireless technology implemented. For example, data transceiver 38 can utilize a non-bluetooth technology, such as a standard radio frequency (RF) transmitter and receiver.

In the exemplary embodiment, electrical connector 56 is a universal serial bus (USB) connector. USB is an external bus standard. A USB system can connect as many as 127 peripheral devices simultaneously, such as a mouse, a keyboard, a printer, video equipment, and a scanner. A USB system also is able to support "Plug and Play". Plug and Play is an industry standard architecture for a 32-bit bus. Additionally, USB allows a system to be hot pluggable, i.e., a USB device can be installed or removed without turning off the system power.

Antenna 54 is configured for the technology used, bluetooth, standard RF, or some other technology. For clarity, antenna 54 is not shown in FIG. 4.

Figure 5:
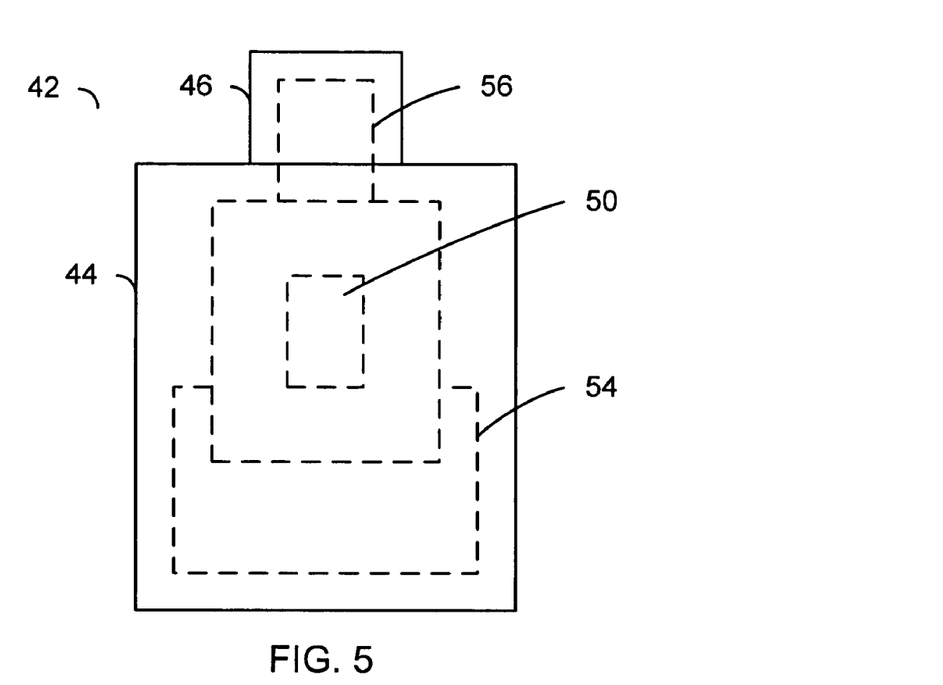
FIG. 5 is a top view of an alternative embodiment of a communication dongle with internal components marked by dashed lines in accordance with one embodiment of the present invention.
Figure 6:
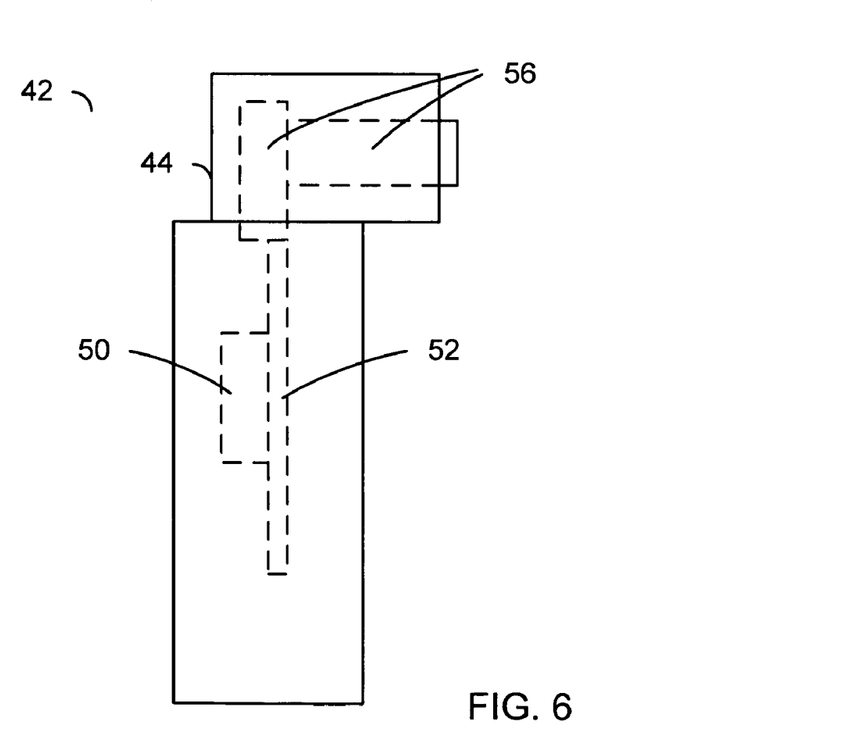
FIG. 6 is a side view of the communication dongle of FIG. 5 with internal components marked by dashed lines in accordance with one embodiment of the present invention.

Referring generally to FIGS. 5 and 6, communication dongle 42 can be configured in a variety of different shapes, sizes and orientations. In the illustrated embodiment, communication dongle 42 is configured so that main body 44 and connector portion 46 are at a right angle to each other. Thus, for example, rather than extending outward from central unit 40, main body 44 can be positioned so that it extends along the side of central unit 40.

Figure 7:
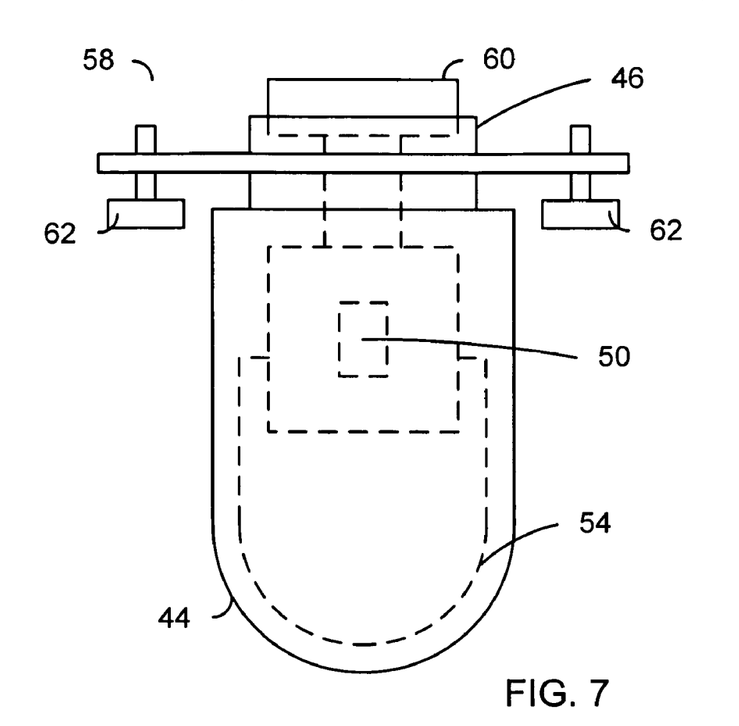
FIG. 7 is a top view of an alternative embodiment of a communication dongle with internal components marked by dashed lines in accordance with one embodiment of the present invention.

Referring generally to FIG. 7, rather than a USB port, a serial port or some other communication standard port can be used to couple processor 22 to data transceiver 38. In the embodiment illustrated in FIG. 7, system 20 utilizes a communication dongle 58 connected to central unit 40 by a serial connector 60. Serial connector 60 couples IC 50 to central unit 40. The connector portion 46 includes two screws 62 that thread into a corresponding connector on central unit 40 to secure communication dongle 58 to the central unit 40.

Figure 8:
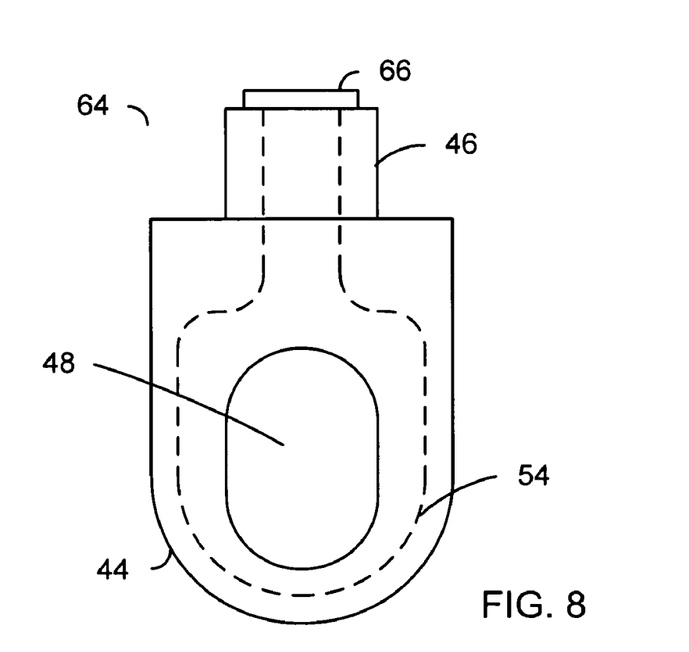
FIG. 8 is a top view of an alternative embodiment of a communication dongle with internal components marked by dashed lines in accordance with one embodiment of the present invention.

Referring generally to FIG. 8, a portion of data transceiver 38 can be disposed within central unit 40. For example, IC 50 and circuit board 52 can be disposed within central unit 40. In the illustrated embodiment, an antenna 54 is disposed within a communication dongle 64. Antenna connector 66 secures communication dongle 64 to central unit 40. Furthermore, the antenna connector 66 couples antenna 54 to central unit 40, and IC 50.

Figure 9:
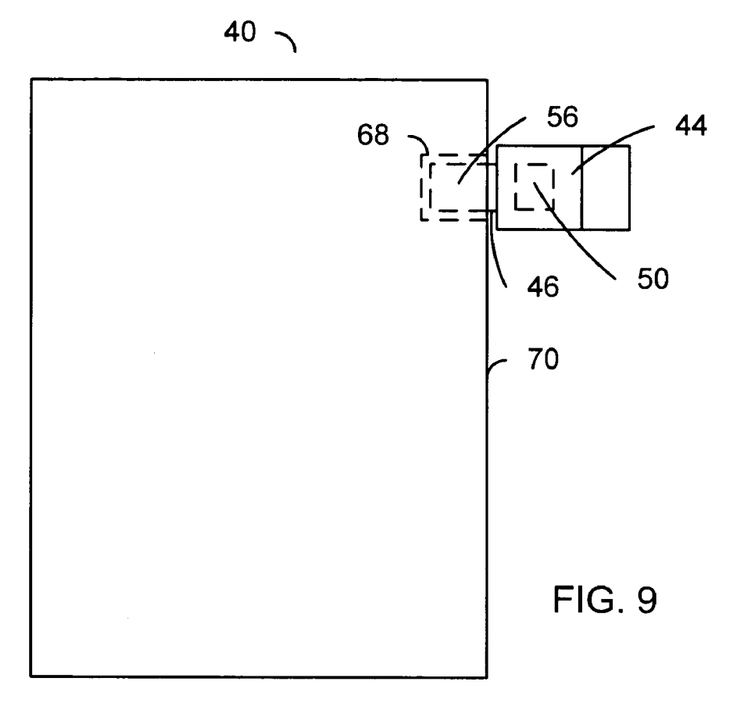
FIG. 9 is a side elevational view of an embodiment of a wireless communication system for a computer with internal components marked by dashed lines in accordance with one embodiment of the present invention.

Referring generally to FIG. 9, communication dongle 42, as illustrated in FIGS. 3 and 4, is secured to a USB connector 68 on a side 70 of central unit 40. Side 70 can be any of the sides of central unit 40, such as the front, back, left, right, or top. In the illustrated embodiment, main body 44 extends directly outward from side 70.

Figure 10:
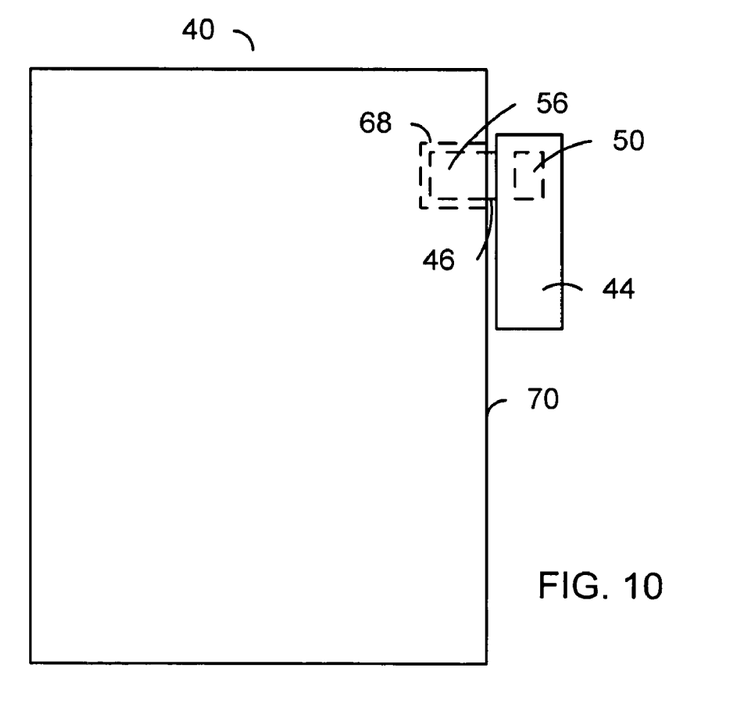
FIG. 10 is a side elevational view of an alternative embodiment of a wireless communication system for a computer with internal components marked by dashed lines in accordance with one embodiment of the present invention.

Referring generally to FIG. 10, communication dongle 42, as illustrated in FIGS: 5 and 6, is similarly. secured to central unit 40. In this embodiment, main body 44 extends downward along side 70. However, main body 44 also can be oriented to extend upward along side 70.

Figure 11:
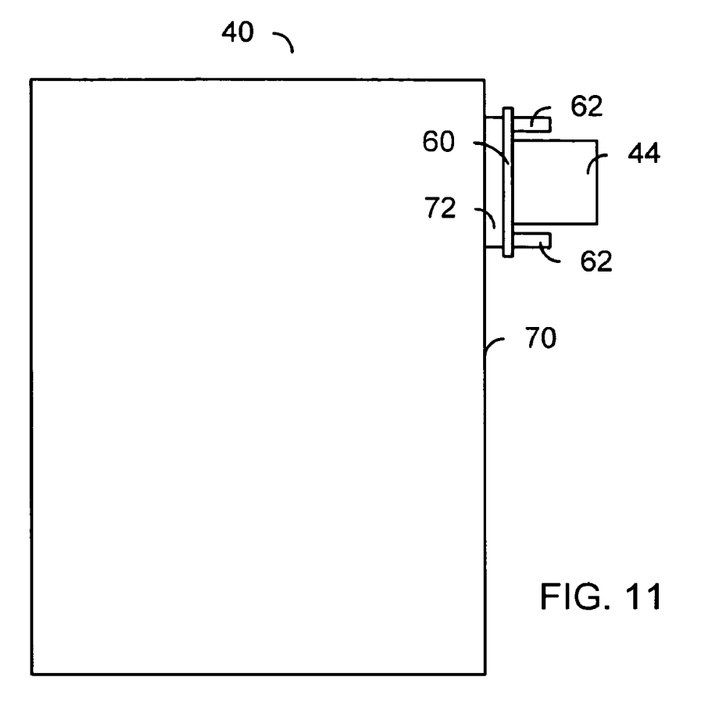
FIG. 11 is a side elevational view of an alternative embodiment of a wireless communication system for a computer with internal components marked by dashed lines in accordance with one embodiment of the present invention.

Referring generally to FIG. 11, communication dongle 58, as illustrated in FIG. 7, is secured to central unit 40. Dongle 58 is secured by threading screws 62 of serial connector 60 into a corresponding serial connector 72 on side 70 of central unit 40.

Figure 12:
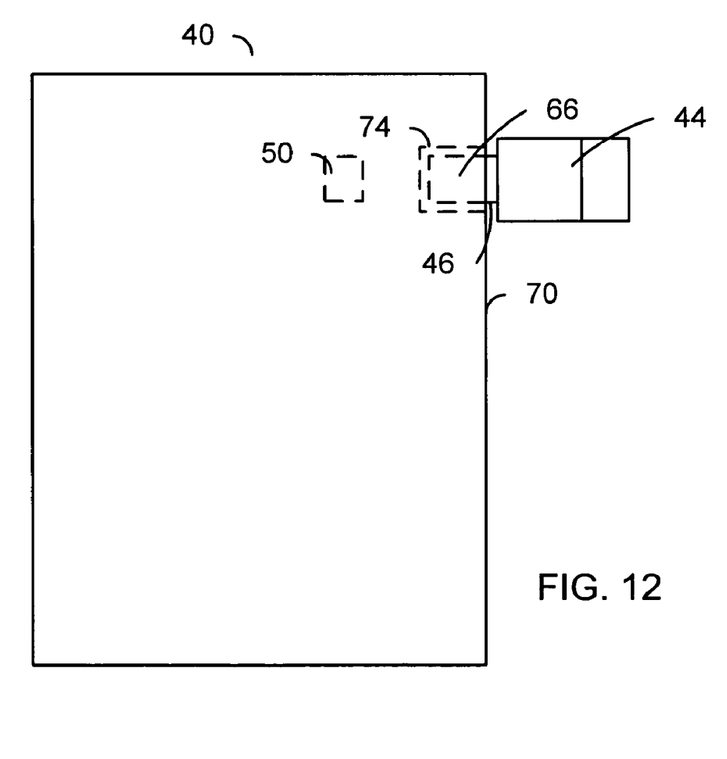
FIG. 12 is a side elevational view of an alternative embodiment of a wireless communication system for a computer with internal components marked by dashed lines in accordance with one embodiment of the present invention.

Referring generally to FIG. 12, communication dongle 64, as illustrated in FIG. 8, is secured to central unit 40 by inserting antenna connector 66 into a corresponding antenna connector 74 on side 70 of central unit 40. Antenna connectors 66 and 74 couple antenna 54 to central unit 40, and IC 50 disposed therein.

Figure 13:
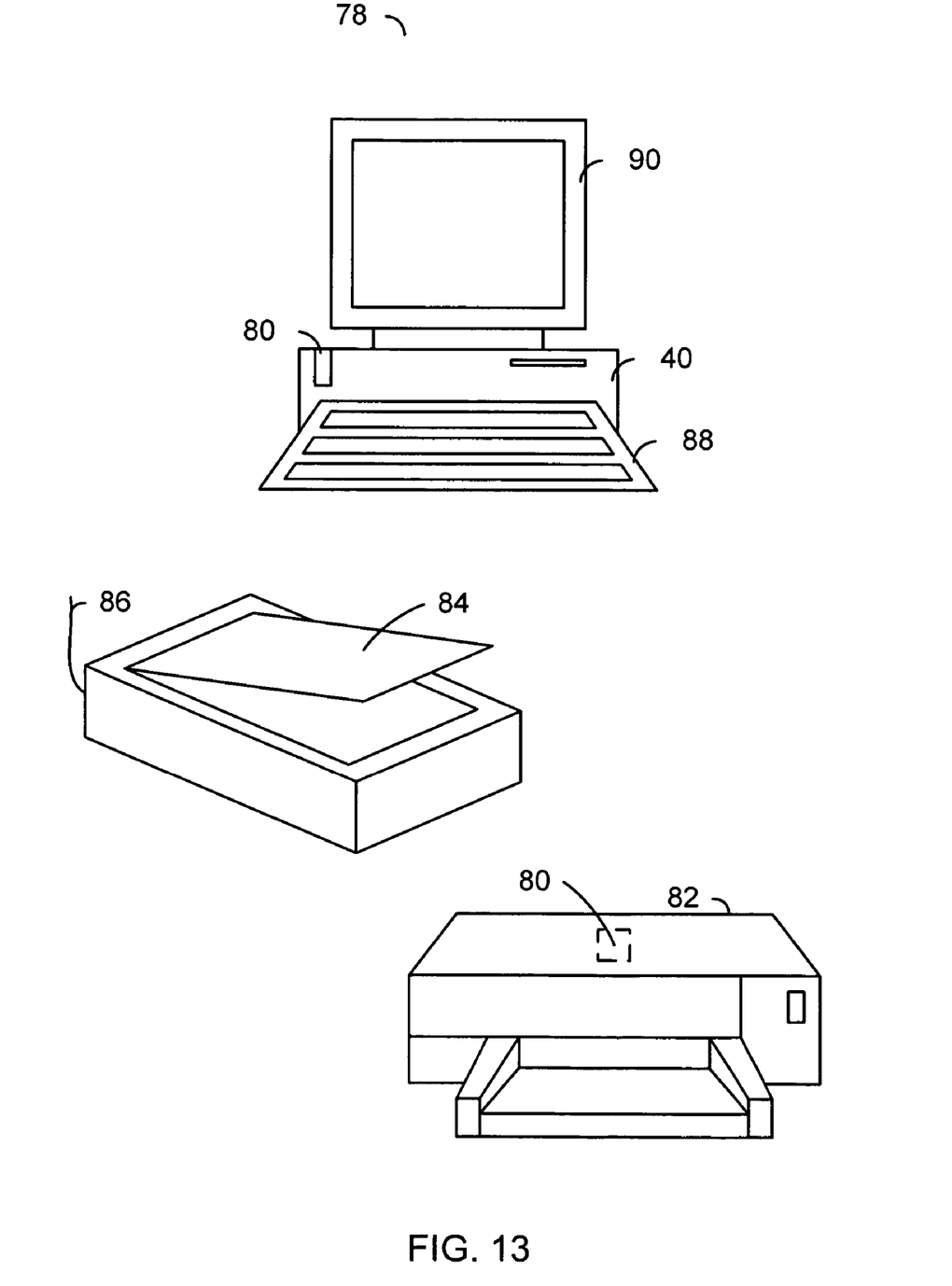
FIG. 13 is a perspective view of a computer system utilizing a wireless communication system, according to one embodiment of the present invention.

Referring generally to FIG. 13, a communication dongle can be used to enable one component of a computer system 78 to communicate wirelessly with another component of the system. System 78 illustrates a few of the variety of different configurations of components and devices that can be used in a wireless computer system. Some or all of the devices can use a communication dongle, while other devices can be hard wired or use a different device to communicate wirelessly.

In the illustrated embodiment, a communication dongle 80 is coupled to a central unit 40 to enable central unit 40 to communicate wirelessly with several peripheral devices. Communication dongle 80 can be any of the embodiments of a communication dongle described above or otherwise designed for a given application. Preferably, the wireless communication system utilizes bluetooth technology.

In the illustrated embodiment, communication dongle 80 also is used with a printer 82 to enable printer 82 to communicate with the central unit 40. Printer 82 can use communication dongle 80 to communicate with other peripheral devices. System 78 also includes a scanner 84. In this embodiment, scanner 84 uses an antenna wire 86, rather than a communication dongle 80, to communicate wirelessly with communication dongle 80 of central unit 40. System 78 also includes a keyboard 88. In the illustrated embodiment, keyboard 88 is designed for wireless communication with central unit 40 via bluetooth technology. However, the wireless communication elements of keyboard 88 are built into keyboard 88, therefore, there are no external communication components, such as communication dongle 80 or antenna wire 86. System 78 also includes a monitor 90. In the illustrated embodiment, monitor 90 is hardwired to central unit 40.

However, monitor 90 also can be wirelessly coupled to central unit 40 with a communication dongle.

It will be understood that the foregoing description is of preferred embodiments of this invention, and that the invention is not limited to the specific forms shown. Additionally, use of the terms "first" and "second" throughout this document is for aiding in description of the overall system, and should not be construed as requiring a specific orientation or arrangement of components. These and other modifications may be made in the design and arrangement of the elements without departing from the scope of the invention as expressed in the appended claims.

What is claimed is:

1. An electronic system comprising:
    a first electronic device having a universal serial bus (USB) port;
    a second electronic device; and
    a wireless communication system for communicating information between the first and second electronic devices, the wireless communication system comprising:
        an adapter having a main body, a USB connector coupled to the main body for selective mating engagement with the USB port, and an antenna for transmitting and/or receiving information, wherein the adapter is configured to communicate information between the first and second electronic devices by use of the antenna of the adapter, and is configured such that the weight of the main body is supported by mating engagement of the adapter with the first electronic device.

2. The electronic system of claim 1, comprising a transmitter electrically coupled to the antenna.

3. The electronic system of claim 2, wherein the transmitter is disposed within the main body.

4. The electronic system of claim 1, comprising a receiver electrically coupled to the antenna.

5. The electronic system of claim 4, wherein the receiver is disposed within the main body.

6. The electronic system of claim 1, wherein the wireless communication system utilizes a bluetooth wireless communication standard.

7. The electronic system of claim 1, wherein the wireless communication system utilizes a radio frequency (RF) wireless communication standard.

8. The electronic system of claim 1, comprising an integrated circuit, the integrated circuit comprising a transceiver electrically coupled to the antenna.

9. The electronic system of claim 8, wherein the integrated circuit is disposed within the main body.

10. The electronic system of claim 8, wherein the first electronic device comprises an enclosure and the integrated circuit is disposed within the enclosure and electrically coupled to the antenna via the USB connector.

11. The electronic system of claim 1, wherein the adapter is configured such that the weight of the main body is supported entirely by the mating engagement of the USB connector with the USB port.

12. The electronic system of claim 1, wherein the main body is directly coupled to the USB connector.

13. The electronic system of claim 12, wherein the main body is disposed substantially perpendicular to the USB connector.

14. The electronic system of claim 12, wherein the main body is disposed inline with the USB connector.

15. The electronic system of claim 14, wherein the main body has an elongated geometry and a profile having at least one dimension substantially similar to that of the USB connector.

16. The electronic system of claim 1, wherein the antenna is disposed within the main body.

17. An electronic system comprising:
    a wireless communication adapter including:
        an antenna for transmitting and/or receiving information;
        a main body; and
        a connector coupled to the main body, wherein the connector is configured to enable selective mating engagement of the connector with a connection port of a first electronic device, wherein the connector and the connection port respectively comprise a universal serial bus (USB) connector and a USB port, or an IEEE 1394 connector and an IEEE 1394 port;
    wherein the wireless communication adapter is configured to communicate information between the first electronic device and a second electronic device via the antenna of the wireless communication adapter, is configured such that the main body is disposed substantially external to the first electronic device upon engagement of the connector with the connection port, and is configured such that the weight of the wireless communication adapter is supported by mating engagement of the wireless communication adapter with the first electronic device.

18. The electronic system of claim 17, wherein the wireless communication adapter is configured to communicate with the first electronic device via the connector and to communicate with the second electronic device via the antenna.

19. The electronic system of claim 17, wherein the wireless communication adapter comprises a transceiver electrically coupled to the antenna and configured to transmit data to, and receive data from, the second electronic device.

20. The electronic system of claim 19, wherein the wireless communication adapter consists essentially of:
    the antenna;
    the connector; and
    the transceiver.

21. The electronic system of claim 17, wherein the wireless communication adapter is configured such that the weight of the wireless communication adapter is supported entirely by the mating engagement of the connector with the connection port.

22. The electronic system of claim 17, wherein the connector comprises the universal serial bus (USB) connector and the connection port comprises the USB port.

23. The electronic system of claim 17, wherein the connector comprises the IEEE 1394 connector and the connection port comprises the IEEE 1394 port.

24. The electronic system of claim 17, wherein the antenna comprises an internal antenna disposed within a main body of the wireless communication adapter.

25. The electronic system of claim 17, wherein the wireless communication adapter is hot-pluggable.

26. A method of communicating information wirelessly between components of an electronic system, comprising:
    coupling a wireless adapter to a first electronic device of the electronic system such that the wireless adapter is disposed substantially external to the first electronic device and such that the weight of the wireless adapter is supported by mating engagement of the wireless adapter with the first electronic device, the wireless adapter including an antenna electrically coupled to a connector of the wireless adapter, wherein coupling the wireless adapter to the first electronic device comprises inserting the connector of the wireless adapter into a connection port of the first electronic device, and wherein inserting the connector comprises inserting a universal serial bus (USB) connector or an IEEE 1394 connector into the connection port; and communicating between the first electronic device and a second electronic device via the antenna of the wireless adapter.

27. The method of claim 26, wherein inserting the connector comprises inserting the universal serial bus (USB) connector into the connection port.

28. The method of claim 26, wherein inserting the connector comprises inserting the IEEE 1394 connector into the connection port.

29. The method of claim 26, wherein inserting the connector comprises inserting the connector such that the weight of the wireless adapter is supported entirely by mating engagement of the connector with the connection port.

30. The method of claim 26, wherein coupling the wireless adapter comprises coupling a hot-pluggable wireless adapter to the first electronic device.

* * * * *